Dec. 21, 1954   E. W. HAWKINSON   2,697,472
METHOD OF RETREADING PNEUMATIC TIRE CASINGS
Filed Sept. 5, 1952   3 Sheets-Sheet 2
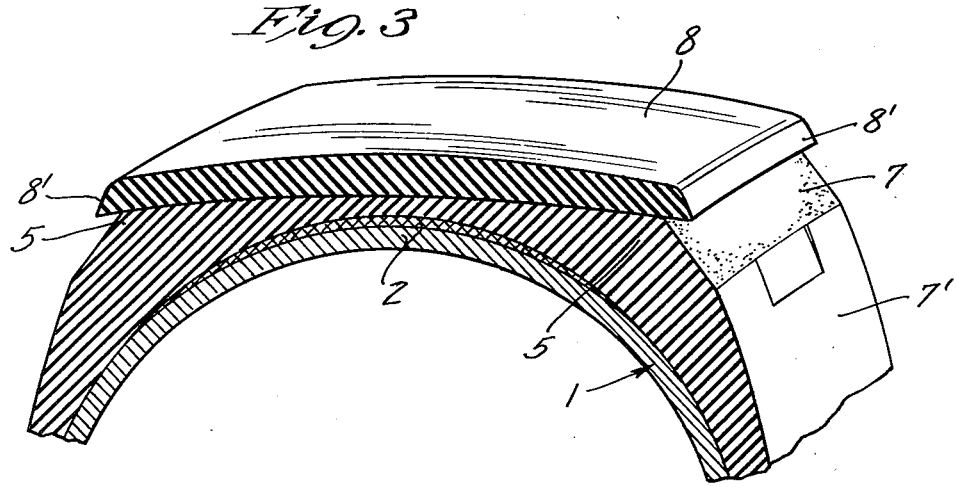
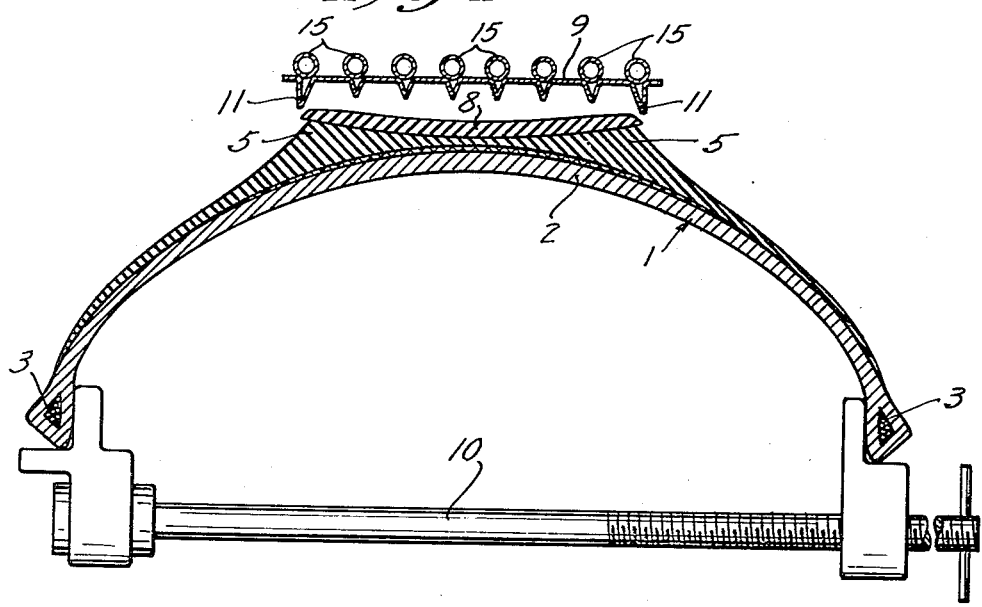
INVENTOR.
Earle W. Hawkinson
BY
Merchant & Merchant
ATTORNEYS Dec. 21, 1954     E. W. HAWKINSON     2,697,472
METHOD OF RETREADING PNEUMATIC TIRE CASINGS
Filed Sept. 5, 1952     3 Sheets-Sheet 3
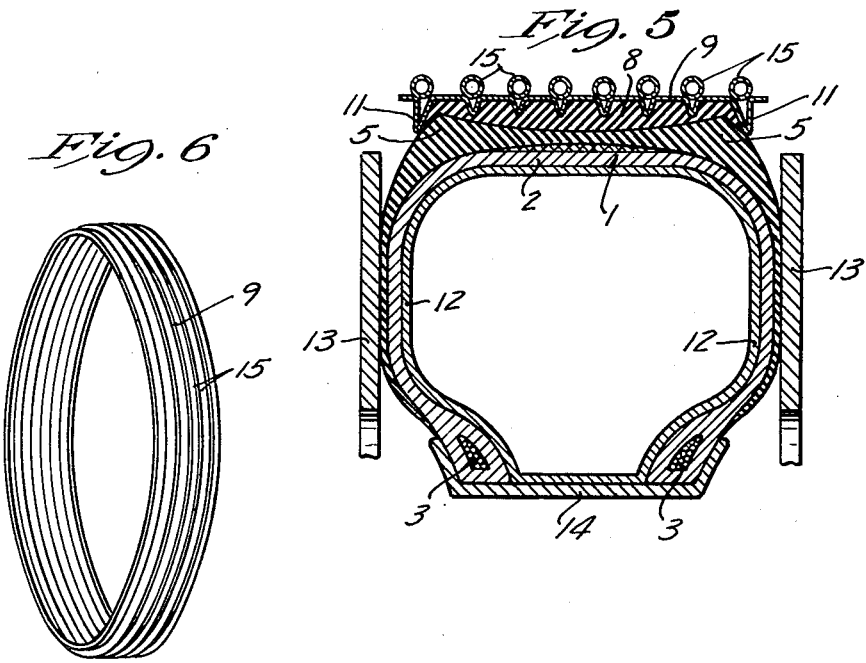
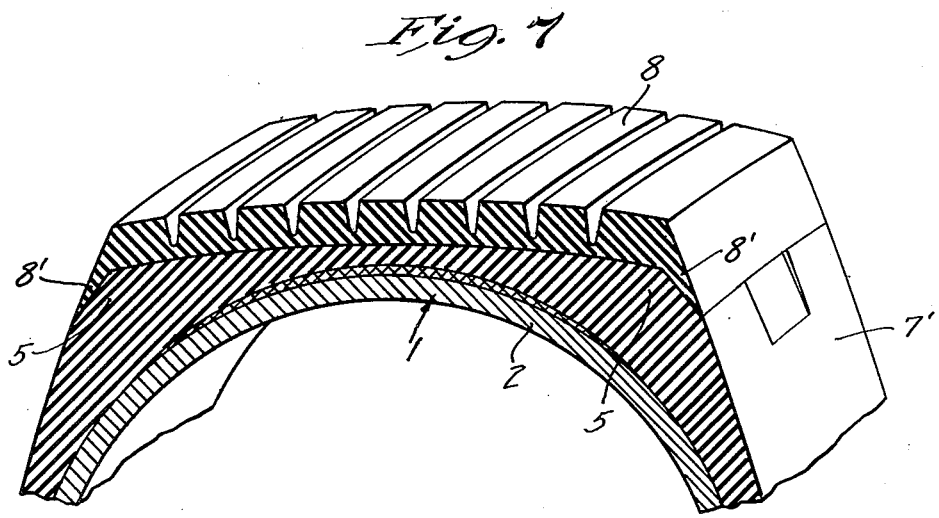
INVENTOR.
Earle W. Hawkinson
BY
Merchant & Merchant
ATTORNEYS

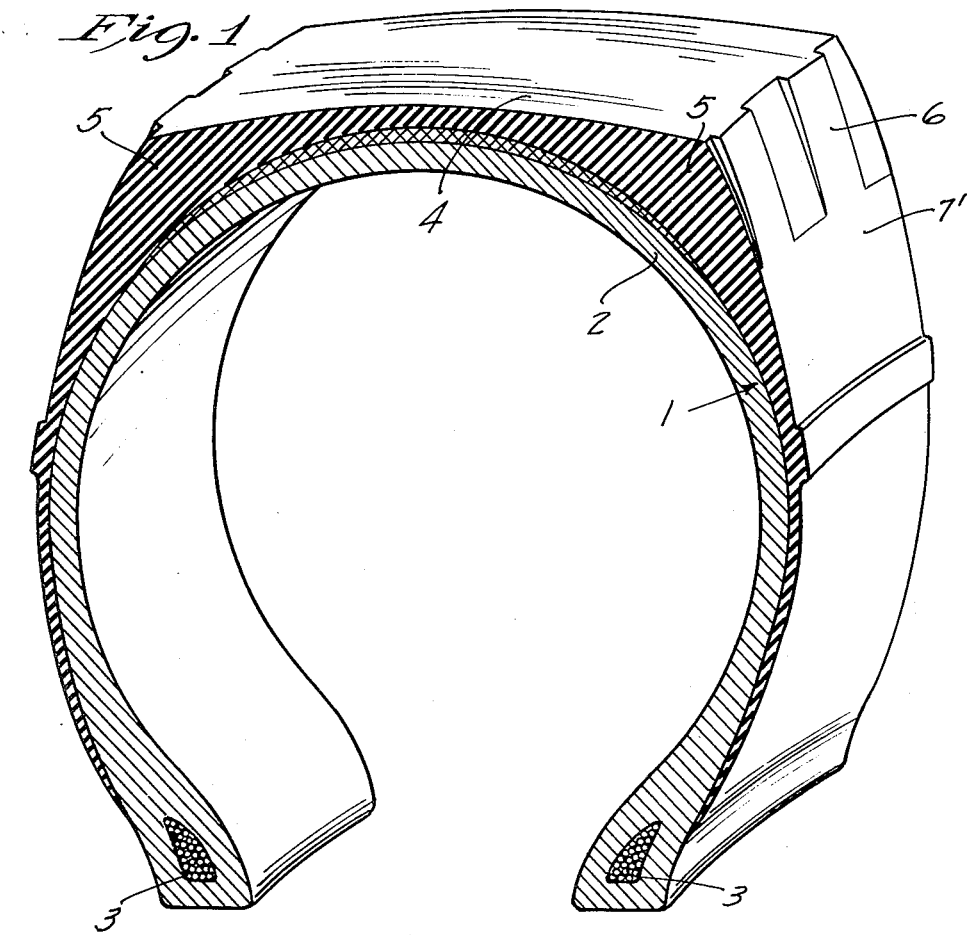
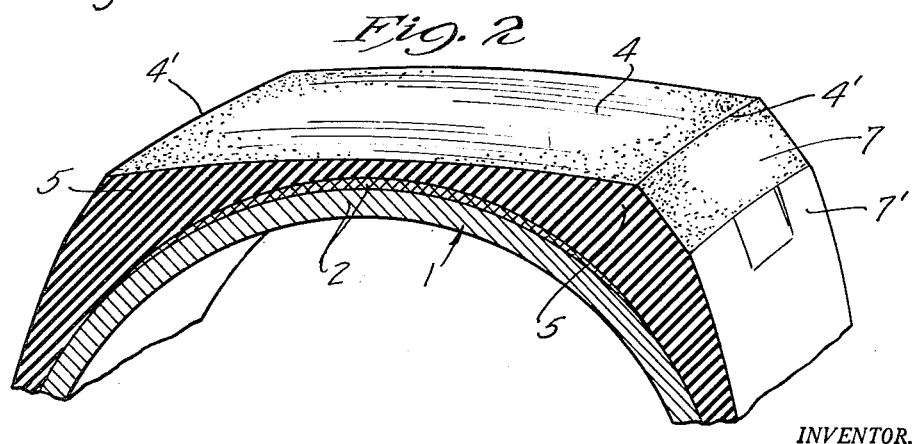

United States Patent Office 2,697,472
Patented Dec. 21, 1954

2,697,472

METHOD OF RETREADING PNEUMATIC TIRE CASINGS

Earle W. Hawkinson, Minneapolis, Minn., assignor to Paul E. Hawkinson Company, Minneapolis, Minn., a corporation of Minnesota Application September 5, 1952, Serial No. 308,133

1 Claim. (Cl. 154—14)

My invention provides a novel method of applying new treads to worn pneumatic tire casings and is in the nature of an improvement upon the method disclosed and broadly claimed in prior Patent 1,917,261 (Re. 21,956)—which method has come to be known commercially as the Hawkinson method.

In said prior patent the confining flanges 10 of the mold or curing matrix 9 rest upon the shoulder portions 19 and do not extend over the side edges of said shoulders. Such an arrangement gives satisfactory results except where the tread design at the shoulders is so deep that the confining flanges 19 do not make a continuous contact with the shoulders. As a result much of the tread material, which turns fluid under vulcanizing heat and pressure, escapes through the tread design openings. Not only is such rubber wasted, but because of the lack of sealing contact, insufficient pressure is obtained adjacent such areas, and consequently, there is an absence of sealing engagement between the newly applied tread stock and the buffed crown of the casing, resulting in a porous cure.

The object of my invention is the provision of a novel method whereby the newly applied tread material may be caused to adhere uniformly—and with sufficient pressure—throughout the circumference of the tire.

A still further object of my invention is the provision of a novel method which inevitably results in a much better looking finished product.

A still further object of my invention is the provision of a method of applying new treads to worn pneumatic tire casings with conventional equipment, which effects a saving of rubber and which will give longer wearing treads.

The above and still further objects of my invention will become apparent from the following specification, appended claims and attached drawings.

Referring with greater particularity to the drawings wherein like characters indicate like parts throughout the several views:

Fig. 1 is a perspective view of a tire section illustrating one step of my novel method;

Fig. 2 is a fragmentary view corresponding to Fig. 1 but showing a further step in my method;

Fig. 3 is a view corresponding to Fig. 2 showing a still further step in my method;

Fig. 4 is a view in vertical section showing a still further step in my method;

Fig. 5 is a view corresponding to Fig. 4 showing the final step in my novel method;

Fig. 6 is a perspective view of the retreading matrix used in the practice of my novel method; and Fig. 7 is a fragmentary view in perspective of a tire section showing a tread applied thereto by my novel method.

Referring with greater particularity to the drawings, the numeral 1 indicates in its entirety a conventional tire casing, the cord carcass of which is identified by the numeral 2, the bead portions by the numeral 3, the worn crown tread portion by the numeral 4, and the relatively thick shoulders on opposite sides of the crown 4 by the numeral 5.

As a first step in my novel method I buff the crown portion 4 so as to roughen and true same up. For this purpose I preferably utilize a precision—or lathe type—buffer as shown in Patent 2,392,667. It is to be noted that the crown portion 4 is relatively flat with respect to the circular cord carcass 2.

The next step in my novel method is to buff a portion of the side surface 6 of the shoulders 5 whereby to remove or materially reduce the tread design appearing on said portion 6. As shown in Fig. 2, not all of the side surface 6 of the shoulders 5 is customarily buffed. Preferably, and as there shown, a flat surface 7 of a width only substantially 50% of the width of the side surface 6 is so buffed. This annular area, identified by the numeral 7, is at obtuse angles to the crown portion 4 as well as to the side walls 7' therebelow.

Subsequently, a light coating of rubber cement is applied to the buffed surfaces 4 and 7. When this cement has been allowed to dry sufficiently, a strip of uncured tread stock 8 is applied to the buffed crown portion 4 throughout the circumference of the tire. As shown particularly in Fig. 3, this tread stock has a width slightly greater than the width of the crown portion 4 between the border lines 4'. Consequently, the opposite side edges 8' of the tread stock strip 8 are caused to overhang the buffed portion 7 of the side of the shoulder. It will be noted that the extent of the overhanging of portions 8' is considerably less than the width of the buffed area 7.

In order to enter a tire casing, so prepared, into an endless matrix mold 9 (of the type illustrated in Patent 1,917,261), the beads 3 thereof are spread laterally by any suitable means such as the spreader identified by the numeral 10. In this manner, all as more clearly described in Patent 1,917,261 (Re. 21,956), the circumference of the crown portion of the tire, with the new tread material 8 applied thereto, is materially reduced. Thereafter, the casing 1 is placed within the matrix 9, and the bead portions 3 are allowed to come together, with the result that the newly applied stock 8 is forced into engagement with the inner surfaces of the matrix 9. Said matrix 9, which, as shown, is preferably flat in cross-section, has a normal diameter less than that of the casing 1. Furthermore, the continuous confining flanges 11, adjacent opposite edges of the mold 9, are spaced apart only a slightly greater distance than the width of the newly applied tread stock 8. As a result, as the beads are permitted to come together the newly applied tread stock is forced into engagement with the mold and the confining flanges make sealing contact with the buffed portion 7 on the sides of the shoulders 5 radially inwardly of the opposite side edges 8' of the tread stock 8. Note that this pressure has caused the overhanging portions 8' of Fig. 3 to come into engagement with the buffed and cemented area 7.

As final steps in my novel method I apply internal expanding pressure to the casing and heat to the matrix. As shown in Fig. 5, the internal expanding pressure is applied through the medium of an inner-tube 12. Side plates 13, and a conventional rim 14 are also preferably utilized. Heat is applied to the matrix through the medium of spirally-wound continuous heating tubes 15.

As shown in Fig. 7, treads applied in this novel manner are not only attractive in appearance but also avoid the possibility of inadequate pressure at spaced intervals— due to deep tread designs in the shoulders.

My novel method has been tried commercially and has been found to be completely satisfactory for the accomplishment of the objects above set forth.

What I claim is:

The method of applying new treads to worn pneumatic tire casings having relatively flat crown surfaces bounded by relatively thick shoulders on opposite sides, said method comprising buffing the crown surface of said casing throughout its circumference to true up same, buffing the side surfaces of the shoulders at obtuse angles to said crown surface whereby to remove the tread design from the buffed portions of said shoulders, applying uncured tread stock to said buffed crown portion throughout the circumference of same, said tread stock having a width greater than the width of said buffed crown portion whereby the opposite side edges of said tread stock overhang the buffed side surfaces of said shoulders, said overhang being of less width than the buffed side surfaces of said shoulders, spreading the beads of said casing laterally to circumferentially contact said crown surface with the newly applied tread material thereon, placing said casing within a curing matrix which has a diameter less than that of said casing and which has endless circumferential confining flanges at its opposite edges which are spaced apart only a slightly greater distance than the width of said tread stock, permitting expansion of said casing by releasing the beads thereof whereby said uncured tread stock is received within said matrix, and the confining flanges of said matrix will make sealing engagement with the buffed side surfaces of said shoulders radially inwardly of the overhanging portion of said tread stock, applying internal expanding pressure to said casing, and applying vulcanizing heat to said matrix.

References Cited in the file of this patent

UNITED STATES PATENTS

| Number | Name | Date |
|---|---|---|
| Re. 21,956 | Hawkinson | Nov. 25, 1941 |
| 2,297,354 | Hawkinson | Sept. 29, 1942 |
| 2,422,652 | Bacon | June 24, 1947 |